United States Patent [19]
Aonuma et al.

[11] Patent Number: 4,816,519
[45] Date of Patent: Mar. 28, 1989

[54] HIGH STRENGTH-HIGH MODULUS RUBBER COMPOSITION COMPRISING A MIXTURE OF RUBBERY COPOLYMERS OF AN ACENAPHTHALENE COPOLYMER AND ANOTHER RUBBER

[75] Inventors: Mitsuyoshi Aonuma; Koichi Nishimura, both of Kawasaki, Japan

[73] Assignee: Nippon Zeon Co., Ltd., Tokyo, Japan

[21] Appl. No.: 140,897

[22] Filed: Jan. 4, 1988

Related U.S. Application Data

[63] Continuation of Ser. No. 896,455, Aug. 14, 1986, abandoned.

[51] Int. Cl.[4] .............................................. C08L 45/00
[52] U.S. Cl. .................................... 525/216; 525/289; 526/280
[58] Field of Search ................. 526/280; 525/289, 216

[56] References Cited

U.S. PATENT DOCUMENTS

| | | | |
|---|---|---|---|
| 2,445,181 | 7/1948 | Miller | 526/280 |
| 2,563,524 | 8/1951 | Flowers | 526/280 |
| 2,803,622 | 8/1957 | Chapin | 526/280 |
| 3,781,259 | 12/1973 | Hsieh | 526/280 |
| 4,093,678 | 6/1978 | Bailey | 526/280 |
| 4,250,271 | 2/1981 | Morris et al. | 525/66 |
| 4,289,687 | 9/1981 | Hagiwara | 525/289 |
| 4,373,046 | 2/1983 | Hagiwara | 526/280 |

Primary Examiner—Paul R. Michl
Assistant Examiner—Patrick A. Doody
Attorney, Agent, or Firm—Sherman and Shalloway

[57] ABSTRACT

A rubber composition comprising a rubbery copolymer containing an acenaphthylene-type monomer as a copolymer component or a mixture of it with another rubber, and compounding agents. This composition gives a rubber vulcanizate having high strength and high modulus.

7 Claims, No Drawings

HIGH STRENGTH-HIGH MODULUS RUBBER COMPOSITION COMPRISING A MIXTURE OF RUBBERY COPOLYMERS OF AN ACENAPHTHALENE COPOLYMER AND ANOTHER RUBBER

This application is a continuation of application Ser. No. 896,455 filed Aug. 14, 1986, now abandoned.

This invention relates to a rubber composition capable of giving vulcanized products of high strength and modulus which comprises a rubbery copolymer containing acenaphthylene-type monomer units as a copolymer component.

In order to increase the strength and modulus of rubber vulcanizates, methods have widely been practiced in the rubber industry which comprise blending fine particulate reinforcing agents such as carbon black and silica, or chopped monofilaments of polyesters or nylon, with rubber. These methods, however, have the defect that increasing the amount of the particulate reinforcing agents or chopped monofilaments to be blended in an attempt to increase modulus results in a decrease in strength.

It is an object of this invention therefore to increase the strength and modulus of a rubber vulcanizate without the foregoing defect.

The present inventors have made extensive investigations in order to achieve this object, and have found that a rubber vulcanizate having high strength and modulus can be obtained by using a rubbery copolymer containing an acenaphthylene-type monomer as a copolymer component.

Thus, according to this invention, there is provided a high strength-high modulus rubber composition comprising (a) a rubbery copolymer containing an acenaphthylene-type monomer as a copolymer component or a mixture of it with another rubber and (b) compounding agents.

The rubbery copolymer containing acenpahthylene-type monomer units, as referred to in this invention, (which may sometimes be referred to as the acenaphthylene rubber hereinafter), includes, for example, (1) conjugated diene-type and non-conjugated diene-type rubbery copolymers obtained by copolymerizing an acenaphthylene-type monomer with another monomer copolymerizable therewith, (2) rubbery block copolymers containing polymer blocks of the acenaphthylene-type monomer or polymer blocks of the above monomer and another monomer copolymerizable with it, and conjugated diene-type rubber blocks or nonconjugated diene-type rubber blocks in the same molecule, and (3) rubbery graft copolymers obtained by grafting a polymer of the acenaphthylene-type monomer or a copolymer of it with another monomer copolymerizable with it to conjugated diene-type rubbers or non-conjugated diene-type rubbers.

The acenaphthylene-type monomer denotes acenaphthylene and acenaphthylene having at least one substituent which does not inhibit its polymerizability on the carbon of the vinylene group and the naphthalene ring. Examples of the substituent are alkyl, cycloalkyl, alkenyl, aralkyl, alkynylene, aralkylene, halogen, hydroxy, alkoxy, carboxy, alkylcarboxy, mercapto, amino, N-alkylamino, and N,N-dialkylamino. Specific examples of the acenaphthylene-type monomer are acenaphthylene, 1-methylacenaphthylene, 3-methylacenaphthylene, 5-methylacenaphthylene, 3-methoxyacenaphthylene, 5-methoxyacenaphthylene, 3-dimethylacenaphthylene, 3-phenylacenaphthylene, 1-chloroacenaphthylene, 1,3,5-trichloroacenaphthylene, 3,5-dibromoacenaphthylene, 3,5,8-tribromoacenaphthylene, acenaphthylene-4-carboxylic acid and acenaphthylene-5-carboxylic acid.

Monomers other than the acenaphthylene-type monomer which constitute the conjugated diene-type rubbery copolymer used in this invention are conjugated-diene-type monomer or combinations thereof with other monomers copolymerizable therewith. Examples of the conjugated diene-type monomer are 1,3-butadiene, isoprene, 1,3-pentadiene, 1-chlorobutadiene and chloroprene. Examples of the other copolymerizable monomer include styrene monomers such as styrene, α-methylstyrene, 2-chlorostyrene and p-chloromethylstyrene; unsaturated nitrile monomers such as acrylonitrile and methacrylonitrile; acrylates such as methyl acrylate, ethyl acrylate, n-butyl acrylate, propyl acrylate, n-octyl acrylate, methoxymethyl acrylate, methoxyethyl acrylate and ethoxyethyl acrylate and the corresponding methacrylates; unsaturated carboxylic acids such as acrylic acid, methacrylic acid, maleic acid and monomethyl maleate; cyano-substituted alkyl esters of (meth)acrylic acid such as cyanomethyl(meth)acrylate, 2-cyanoethyl(meth)acrylate and 3-cyanopropyl acrylate; and unsaturated amide-type monomers such as acrylamide and N,N-dimethylacrylamide.

Examples of monomers other than the acenaphthylene-type monomer which constitute the non-conjugated diene-type rubbery copolymer used in this invention include olefinic monomers such as ethylene, propylene and 1-butene; halogenated olefinic monomers such as vinyl chloride, vinylidene chloride, vinyl fluoride, vinylidene fluoride, tetrafluoroethylene and hexafluoropropylene; the styrene monomers mentioned above; the unsaturated nitrile monomers mentioned above; the acrylates and methacrylates mentioned above; the unsaturated carboxylic acids mentioned above; the cyano-substituted alkyl esters of (meth)acrylic acid mentioned above; vinyl esters such as vinyl acetate, vinyl propionate and vinyl butyrate; vinylketones such as methyl vinyl ketone and ethyl vinyl ketone; hydroxyl-containing vinyl monomers such as betahydroxyethyl acrylate and 4-hydroxybutyl acrylate; epoxy group-containing monomers such as glycidyl acrylate, glycidyl methacrylate, vinyl glycidyl ether, allyl glycidyl ether and methallyl glycidyl ether; and halogen-containing monomer such as 2-chloroethyl vinyl ether, vinyl chloroacetate, allyl chloroacetate and vinyl benzyl chloride. These monomers may be used singly or in combination.

Monomers which can be radical-copolymerized with the acenaphthylene-type monomers are especially preferred as the other monomers which constitute the above two types of acenaphthylene rubber. The content of the acenaphthylene-type monomer in the acenaphthylene rubber is preferably 2 to 60% by weight. If it is less than 2% by weight, the effect of the present invention is small. If it exceeds 60% by weight, the resulting composition loses rubbery elasticity and become resinous. The more preferred content is 5 to 40% by weight. The type and proportion of the other monomer copolymerizable with the acenaphthylene monomer can be determined according to the compatibility of the rubbery component with another rubber and the purpose for which the resulting rubber composition is used, but are not particularly restricted if the resulting acenaphthylene rubber has a glass transition temperature of not more than 10° C.

The acenaphthylene rubber used in this invention is produced by an ordinary polymerization method. For example, the acenaphthylene rubber as a random copolymer can be produced by subjecting a mixture of the acenaphthylene-type monomer and a conjugated or non-conjugated diene-type monomer to bulk polymerization, solution polymerization, suspension polymerization or emulsion polymerization using a radical polymerization initiator. An anionic polymerization catalyst, a cationic polymerization catalyst or a Ziegler-Natta catalyst may be used as a polymerization catalyst in the above method. The acenaphthylene rubber as a block copolymer can be produced, for example, by a method comprising blocking a polymer of a conjugated diene-type monomer with a living acenaphthylene-type homopolymer or copolymer obtained by using an anionic polymerization catalyst, or a method which comprises blocking a polymer of a conjugated diene-type monomer with an acenaphthylene-type polymer having a peroxide group at the ends of the molecular chain obtained by radical polymerization. The acenaphthylene rubber as a graft copolymer can be obtained by grafting an acenaphthylene-type polymer to a conjugated diene-type polymer or a non-conjugated diene-type polymer by a known radical graft polymerization method or anion graft polymerization method.

Examples of the acenaphthylene rubber used in this invention include conjugated diene-type acenaphthylene rubbers such as acenaphthylene-butadiene copolymer rubber, acenaphthylene-isoprene copolymer rubber, acenaphthylene-chloroprene copolymer rubber, acenaphthylene-butadiene and/or isoprene-styrene copolymer rubber, acenaphthylene-butadiene and/or isoprene-acrylonitrile copolymer rubber and ethylene-propylene-diene terpolymer rubber-graft-conjugated diene-type acenaphthylene rubber; and non-conjugated diene-type acenaphthylene rubbers such as acenaphthylene-acrylonitrile-butyl acrylate copolymer, acenaphthylene-cyanoethyl acrylate-butyl acrylate copolymer rubber, acenaphthylene-butyl acrylate copolymer rubber, acenaphthylene-ethyl acrylate-methoxyethyl acrylate-glycidyl methacrylate copolymer rubber, acenaphthylene-ethylene-vinyl acetate copolymer rubber, acenaphthylene-ethylene-vinyl acetate-chlorovinyl ether copolymer rubber, (polyacenaphthylene)-(vinylidene fluoride-hexafluoropropylene copolymer) block copolymer and ethylene-propylene-diene terpolymer rubber-graft-non-conjugated-type acenaphthylene rubber.

In the rubber composition of this invention, the acenaphthylene rubber is used either alone or as a mixture with another rubber. When the acenaphthylene rubber is used with the other rubber, the amount of the acenaphthylene rubber is preferably at least 5% by weight based on the mixed rubber. It it is less than 5% by weight, a rubber composition capable of giving a vulcanizate of high modulus cannot be obtained. The more preferred amount of the acenaphthylene rubber is at least 10% by weight, especially at least 20% by weight.

Examples of the other rubber to be mixed with the acenaphthylene rubber in this invention are polybutadiene rubber, natural or synthetic polyisoprene rubber, styrene-butadiene copolymer rubber, acrylonitrile-butadiene copolymer rubber, chloroprene rubber, ethylene-propylene-diene monomer terpolymer rubber, acrylic rubber and fluorine rubber.

The rubber composition of this invention is obtained by mixing the above rubber component with compounding agents by using an ordinary mixer.

The compounding agents used in this invention are those customarily used in the rubber industry, and include, for example, sulfur vulcanization systems comprising sulfur or sulfur-donating compounds, vulcanization aids, vulcanization accelerators, etc.; organic peroxide vulcanization systems; reinforcing agents such as carbon black and silica; fillers such as calcium carbonate and talc; inorganic or organic fibrous reinforcing materials; plasticizers; softening agents; processing aids; and antioxidants. The types and amounts of the compounding agents are properly determined depending upon the purpose for which the rubber composition of this invention is used.

The rubber composition of this invention is suitable for use in automotive rubber parts such as tires, safety bumpers, brake parts, hoses, interior finishing and equipment parts, boots, and belts; industrial rubber parts such as belts, hoses, and rolls; rubber materials for use in ships and for marine uses, such as fender beams and marine hoses; rubber parts for oil wells; and footwear.

The following Production Examples and Examples specifically illustrate the present invention. All parts in these examples are by weight.

PRODUCTION EXAMPLE 1

Each of the monomeric mixtures indicated in Table 1 was polymerized in a 2-liter autoclave in accordance with the following polymerization recipes (I) and (II). Prior to polymerization, the individual ingredients of polymerization recipe (I) were charged into the autoclave. The pH of the mixture was adjusted to 7, and with stirring, the temperature of the inside of the autoclave was adjusted to 5° C. After purging the inside of the autoclave with nitrogen, the individual ingredients of the polymerization recipe (II) were added, and the polymerization was started. The polymerization was terminated in 15 hours. The polymerization conversion was in the range of 88 to 98%. After the polymerization, the polymerization product was salted out, washed thoroughly with water, then dissolved in acetone, and coagulated with a large amount of hexane, followed by drying under reduced pressure to give a polymer.

Polymerization recipe (I)

| Ingredient | Amount (g) |
| --- | --- |
| Water | 100 |
| Sodium dodecylbenzenesulfonate | 20 |
| Sodium naphthalene sulfonate | 10 |
| Sodium sulfate | 3 |
| Tetrasodium ethylenediaminetetraacetate | 0.2 |
| Ferric sodium ethylenediaminetetraacetate | 0.005 |
| Monomeric mixture (Table 1) | |

Polymerization recipe (II)

| Ingredient | Amount (g) |
| --- | --- |
| $Na_2B_2O_4$ | 0.2 |
| Sodium formaldehyde sulfoxylate | 0.2 |
| p-Menthane hydroperoxide | 0.1 |

TABLE 1

| Monomer | Charged composition (wt. %) | | | | Polymer composition (wt. %) | | | |
|---|---|---|---|---|---|---|---|---|
| | (A) | (B) | (C) | (D) | A | B | C | D |
| Ethyl acrylate | 53 | 46 | 39 | 33 | 52.7 | 46.2 | 40.2 | 38.4 |
| Butyl acrylate | 25 | 22 | 19 | 16 | 25.1 | 22.3 | 21.3 | 19.0 |
| Methoxyethyl acrylate | 20 | 17 | 14 | 13 | 20.3 | 17.8 | 16.9 | 15.2 |
| Glycidyl methacrylate | 2 | 2 | 2 | 2 | 1.9 | 1.9 | 1.9 | 1.8 |
| Acenaphthylene | 0 | 13 | 26 | 36 | 0 | 11.8 | 19.7 | 25.6 |

The composition of the polymer was analyzed by $^{13}C$ NMR spectrum.

$^{13}C$ NMR chemical shifts (ppm; standard TMS, CDCl$_3$ solvent):

52.4: $-\overset{*}{C}H-\overset{*}{C}H-$ of acenaphthylene

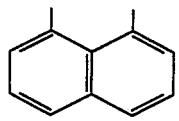

60.5: $-O-\overset{*}{C}H_2-CH_3$ of ethyl acrylate 64.4: $-O-\overset{*}{C}H_2-CH_2-CH_2-CH_3$ 70.2: $-O-\overset{*}{C}H_2-CH_2-O-CH_3$ of methoxyethyl acrylate

PRODUCTION EXAMPLE 2

In a 1-liter autoclave, polymerization was carried out in accordance with polymerization recipe (III) until the conversion of the monomers reached 70%. After the polymerization, a phenolic antioxidant was added to the resulting latex, followed by coagulation in a large amount of methanol. The resulting polymer was washed three times with methanol containing the phenolic antioxidant, and dried in a vacuum dryer. The amounts of combined acrylonitrile and combined acenaphthylene (Table 7) of the polymers (designations E and F) were measured by C-NMR analysis.

Polymerization recipe (III)

| Ingredient | Amount (parts) |
|---|---|
| Monomers (see Table 7) | 100 |
| Benzene | 20 |
| Water | 250 |
| Potassium rosinate | 2.5 |
| Sodium dodecylbenzenesulfonate | 1.0 |
| Sodium sulfate | 0.2 |
| Potassium persulfate | 0.4 |
| Sulfuric acid | 0.1 |
| t-Dodecylmercaptan | 0.3 |

PRODUCTION EXAMPLE 3

A 1-liter autoclave was charged with 200 parts of acenaphthylene, 200 parts of benzene and 1.2 parts of polydiacyl peroxide (the amount of active oxygen 4%, the average degree of polymerization about 10), and polymerization was carried out at 50° C. until the conversion of the monomer reached 20%. After the polymerization, the polymerization product was coagulated with a large amount of methanol, and the resulting polymer was washed twice with methanol, and dried under reduced pressure to give a peroxide group-containing polymer. The polymer had a weight average molecular weight, determined by GPC, of 106,000.

Then, in accordance with polymerization recipe (IV), polymerization was carried out at 70° C. in a 1-liter autoclave until the conversion of the monomers reached 50%. After the polymerization, the polymerization product was coagulated with methanol, washed twice with methanol, and dried under reduced pressure to give a polymer. The polymer (polymer designation G) had a fluorine content of 39.3% by weight.

Polymerization recipe (IV)

| Ingredient | Amount (parts) |
|---|---|
| Vinylidene fluoride | 70 |
| Hexafluoropropylene | 30 |
| Dimethylformamide | 400 |
| Benzene | 100 |
| Peroxide group-containing polymer | 30 |

PRODUCTION EXAMPLE 4

A 1-liter autoclave was charged with 200 parts of acenaphthylene, 100 parts of benzene and 1.2 parts of polydiacyl peroxide (the amount of active oxygen 4%, the average degree of polymerization about 10), and polymerization was carried out at 50° C. until the conversion of the monomer reached 20%. The polymerization product was coagulated with a large amount of methanol, and the resulting polymer was washed twice with methanol, and dried under reduced pressure to give a peroxide group-containing polymer (weight average molecular weight 106,000 determined by GPC and calculated for polystyrene). In accordance with polymerization recipe (V), polymerization was carried out at 50° C. in a 1-liter autoclave until the conversion of the monomers reached 40%. In the same way as in Production Example 1, a polymer H was obtained. The polymer had a weight average molecular weight, calculated for polystyrene, of 38,100.

Polymerization recipe (V)

| Ingredient | Amount (parts) |
|---|---|
| Styrene | 24 |
| Butadiene | 76 |
| Benzene | 500 |
| Peroxide-containing polymer | 30 |

PRODUCTION EXAMPLE 5

A 1-liter autoclave was purged with nitrogen and then charged with 300 g of benzene, 300 g of isoprene and 37.5 millimoles of n-butyl lithium. Polymerization was carried out at 40° C. for 2 hours. Then, 100 millimoles of p-vinylbenzyl chloride was introduced into the autoclave, and the reaction was carried out for 15 minutes. The contents were poured into methanol to separate a liquid polymer which was then dried. The liquid polymer had a weight average molecular weight, calculated for polystyrene, of 9,800.

One hundred grams of the liquid polymer, 50 g of acenaphthylene and 20 g of benzene were taken into a 200 ml glass bottle, and 0.4 g of azobisisobutyronitrile was added. Polymerization was carried out at 60° C.

until the conversion of acenaphthylene reached 40%. The resulting polymer was taken into methanol containing a phenolic antioxidant and coagulated. Thereafter, the polymer was washed twice with n-hexane containing the phenolic antioxidant, and dried in vacuum to give a graft copolymer having a weight average molecular weight, calculated for polystyrene, of 68,400.

Ten grams of polyacenaphthylene having a weight average molecular weight of 286,000 obtained separately by thermal polymerization of acenaphthylene at 110° C. for 70 hours and 10 g of the above graft copolymer were blended with 80 g of Nipol IR 2200 (a product of Nippon Zeon Co., Ltd.) in benzene, and the blend was lyophilized to give a blended rubber.

EXAMPLE 1

The polymers obtained in Production Example 1 and shown in Table 1 were each kneaded in accordance with the compounding recipes shown in Table 2 on a roll to prepare rubber compositions. The rubber compositions were then each press-cured at 170° C. for 20 minutes, and further heat-treated at 150° C. for 4 hours. The properties of the vulcanized products were measured in accordance with JIS K6301, and the results are shown in Table 3.

TABLE 2

| Ingredient (parts) | Compounding recipe | | |
|---|---|---|---|
| | (1) | (2) | (3) |
| Polymer | 100 | 100 | 100 |
| Stearic acid | 1 | 1 | 1 |
| FEF carbon black | — | 40 | 60 |
| Ammonium benzoate | 1 | 1 | 1 |

TABLE 3

| | Invention | | | | Comparison |
|---|---|---|---|---|---|
| Run No. | 1 | 2 | 3 | 4 | 5 |
| Polymer designation | B | C | C | D | A |
| Compounding recipe | | | | | |
| Test results | ① | ① | ② | ① | ⑧ |
| Properties after curing at 170° C. for 20 min. | | | | | |
| Tensile strength (kg/cm²) | 143 | 157 | 161 | 190 | 97 |
| 100% tensile stress (kg/cm²) | 40 | 48 | 58 | 90 | 29 |
| Elongation (%) | 490 | 410 | 330 | 360 | 360 |
| Hardness (JIS, point) | 71 | 78 | 84 | 88 | 57 |
| Properties after heat-treatment at 150° C. for 4 hours following the above curing | | | | | |
| Tensile strength (kg/cm²) | 152 | 164 | 173 | 198 | 108 |
| 100% tensile stress (kg/cm²) | 46 | 53 | 65 | 97 | 40 |
| Elongation (%) | 400 | 330 | 250 | 290 | 290 |
| Hardness (JIS, point) | 74 | 81 | 88 | 89 | 60 |

EXAMPLE 2

The polymers obtained in Production Example 1 were each mixed on a roll, and then in accordance with the compounding recipes shown in Tables 2 and 4, the compounding agents were added to prepare rubber compositions. The rubber compositions were each press-cured at 170° C. for 20 minutes, and further heat-treated at 150° C. for 4 hours. The properties of the resulting vulcanizates were measured as in Example 1. The results are shown in Table 5.

TABLE 4

| Compounding agent | Compounding recipe (parts) | |
|---|---|---|
| | (4) | (5) |
| Polymer | 100 | 100 |
| Stearic acid | 1 | 1 |
| FEF carbon black | 40 | 40 |
| Magnesium oxide | 0.6 | 3 |
| Ethylenethiourea | 0.5 | 1.2 |
| Dipentamethylenethiuram tetrasulfide | 0.5 | — |
| N—cyclohexyl-2-benzothiazyl sulfenamide | 1.0 | — |
| Red lead | — | 5 |
| Nickel dibutyldithiocarbamate | — | 1.0 |

TABLE 5

| | Invention | | | | | | | | Comparison | |
|---|---|---|---|---|---|---|---|---|---|---|
| Run No. | 6 | 7 | 8 | 9 | 10 | 11 | 12 | 13 | 14 | 15 |
| Polymer | | | | | | | | | | |
| A | 50 | | | | | | | | | |
| B | | 50 | | | | | | | | |
| C | | | 30 | | | | | | | |
| D | 50 | | | 10 | 25 | 40 | 40 | 50 | | |
| Acrylic rubber(*1) | | 50 | 70 | 90 | 75 | 60 | 60 | | 100 | |
| Epichlorohydrin rubber(*2) | | | | | | | | 50 | | 100 |
| Compounding recipe | ① | ① | ① | ① | ① | ① | ② | ④ | ③ | ⑤ |
| Properties after curing at 170° C. for 20 min. | | | | | | | | | | |
| Tensile strength (kg/cm²) | 147 | 145 | 138 | 130 | 158 | 174 | 187 | | 108 | 141 |
| 100% tensile stress (kg/cm²) | 43 | 45 | 43 | 40 | 58 | 73 | 91 | | 22 | 42 |
| Elongation (%) | 420 | 480 | 440 | 410 | 400 | 390 | 350 | | 420 | 400 |
| Hardness (JIS, point) | 76 | 71 | 67 | 58 | 70 | 77 | 86 | | 47 | 67 |
| Properties after heat-treatment at 150° C. for 4 hours following the above curing | | | | | | | | | | |
| Tensile strength (kg/cm²) | 158 | 156 | 150 | 148 | 176 | 188 | 190 | 161 | 121 | 170 |
| 100% tensile stress (kg/cm²) | 47 | 51 | 50 | 49 | 69 | 82 | 110 | 92 | 30 | 56 |
| Elongation (%) | 350 | 400 | 350 | 320 | 300 | 300 | 260 | 270 | 320 | 260 |

TABLE 5-continued

|  | | Invention | | | | | | | | Comparison | |
|---|---|---|---|---|---|---|---|---|---|---|---|
| Run No. | 6 | 7 | 8 | 9 | 10 | 11 | 12 | 13 | 14 | 15 |
| Hardness (JIS, point) | 79 | 74 | 71 | 62 | 73 | 81 | 89 | 91 | 53 | 71 |

Note:
[*1]Nipol AR32 made by Nippon Zeon Co., Ltd.
[*2]Hydrin 200 made by B. F. Goodrich Chemical Company

EXAMPLE 3

The polymers obtained in Production Example 2 and shown in Table 7 were each kneaded on a roll in accordance with the compounding recipe shown in Table 6 to form rubber compositions. The compositions were each press-cured at 160° C. for 10 minutes, and the properties of the vulcanizates were measured in accordance with JIS K6301. The results are shown in Table 7.

TABLE 6

| Ingredient | Amounts (parts) |
|---|---|
| Rubbery polymer (Table 7) | 100 |
| Zinc oxide No. 3 | 5 |
| Stearic acid | 1 |
| Sulfur | 0.5 |
| Tetramethylthiuram disulfide | 1.5 |
| N—Cyclohexyl-2-benzothiazyl sulfenamide | 1.5 |

TABLE 7

|  | Comparison[*3] | | Invention | |
|---|---|---|---|---|
| Run No. | 16 | 17 | 18 | 19 |
| Composition of the charge | | | | |
| Acrylonitrile | | | 23 | 29 |
| Butadiene | | | 54 | 48 |
| Acenaphthylene | | | 23 | 23 |
| Composition of the polymer | | | | |
| Acrylonitrile | 38 | 50 | 24 | 29 |
| Butadiene | 62 | 50 | 55 | 45 |
| Acenaphthylene | — | — | 21 | 26 |
| Polymer designation | (*4) | (*5) | E | F |
| Properties of the vulcanizate | | | | |
| Tensile strength (kg/cm$^2$) | 193 | 215 | 286 | 342 |
| Elongation (%) | 440 | 430 | 470 | 440 |
| 100% tensile stress (kg/cm$^2$) | 33 | 42 | 55 | 64 |
| Hardness (JIS) | 71 | 75 | 86 | 91 |
| Percent change of volume (%)[*6] | 30 | 21 | 19 | 16 |

Note
[*3]60 parts of SRF carbon black was further added to the compounding recipe shown in Table 6.
[*4]NIPOL DN 108, made by Nippon Zeon Co., Ltd.
[*5]NIPOL DN 003, made by Nippon Zeon Co., Ltd.
[*6]Immersed in JIS fuel oil B at 40° C. for 72 hours.

EXAMPLE 4

The polymer F of Example 3 and acrylonitrile/butadiene copolymer rubber having a combined acrylonitrile content of 38% by weight (NIPOL DN108, made by Nippon Zeon Co., Ltd.) were mixed in the proportions shown in Table 8, and rubber compositions were prepared in accordance with the compounding recipe shown in Table 6, and press-cured at 160° C. for 10 minutes to give vulcanizates. The properties of the vulcanizates were measured as in Example 1, and the results are shown in Table 8.

TABLE 8

|  | Invention | | | Comparison |
|---|---|---|---|---|
| Run No. | 20 | 21 | 22[*7] | 23 |
| Rubber component | | | | |
| Polymer F | 10 | 50 | 50 | — |
| NIPOL DN108 | 90 | 50 | 50 | 100 |
| Properties of the vulcanizate | | | | |
| Tensile strength (kg/cm$^2$) | 43 | 208 | 238 | 29 |
| Elongation (%) | 490 | 450 | 360 | 460 |
| 100% tensile stress (kg/cm$^2$) | 13 | 36 | 72 | 10 |
| Hardness (JIS) | 48 | 73 | 90 | 46 |
| Percent change of volume (%) | 41 | 24 | 22 | 44 |

[*7]Sixty parts of SRF carbon black was added to the compounding recipe shown in Table 6.

EXAMPLE 5

The polymer G obtained in Production Example 3 and fluorine rubber (Technoflon NH made by Montefluos S.P.A.) were mixed in the proportions shown in Table 10 in ethyl cetate. The solution was added dropwise to liquid nitrogen. The frozen product was taken out, and put into hexane cooled in advance to −60° C. with dry ice to coagulate the polymer. The polymer was washed and then dried under reduced pressure to give a blended rubbery polymer. A mixture of the resulting rubbery polymer and the fluorine rubber [Technoflon FOR 45 (a product of Mentefluos S.P.A.)] was kneaded with the compounding agents shown in compounding recipe 9 on a roll to prepare rubber compositions. The rubber compositions were each press-cured at 170° C. for 10 minutes and further heat-treated at 230° C. for 16 hours. The properties of the vulcanizates were measured as in Example 1, and the results are shown in Table 10.

TABLE 9

| Ingredient | Amount (parts) |
|---|---|
| Polymer | 100 |
| Magnesium oxide | 3 |
| Calcium hydroxide | 6 |
| AC polyethylene 617A[*8] | 1 |
| MT carbon black | variable (see Table 10) |

[*8]Processing aid made by Toyo Chemical Co., Ltd.

TABLE 10

|  | Invention | | Comparison | | |
|---|---|---|---|---|---|
| Run No. | 24 | 25 | 26 | 27 | 28 |
| Rubber component (wt. %) | | | | | |
| Polymer G | 25 | 40 | — | — | — |
| Technoflon NH | 25 | 10 | 50 | — | — |
| Technoflon FOR45 | 50 | 50 | 50 | 100 | 100 |
| Amount of carbon black (parts) | 0 | 0 | 20 | 0 | 60 |
| Properties of the vulcanizate | | | | | |
| Tensile strength (kg/cm$^2$) | 204 | 258 | 167 | 117 | 173 |
| 100% Tensile stress (kg/cm$^2$) | 83 | 107 | 29 | 19 | 147 |
| Elongation (%) | 270 | 230 | 350 | 250 | 120 |
| Hardness (JIS; point) | 86 | 95 | 66 | 55 | 89 |

EXAMPLE 6

Polymer H and styrene/butadiene copolymer rubber (NIPOL 1500, a product of Nippon Zeon Co., Ltd.) were mixed in the proportions shown in Table 12 in benzene, coagulated with a large amount of methanol, and dried under reduced pressure. The mixture was kneaded with compounding agents in a roll in accordance with the compounding recipe shown in Table 11. The rubber compositions were each press-cured at 150° C. for 30 minutes to obtain vulcanizates. The properties of the vulcanizates were measured as in Example 1, and the results are shown In Table 12.

TABLE 11

| Ingredient | Amount (parts) |
| --- | --- |
| Rubber mixture (Table 12) | 100 |
| Zinc oxide No. 1 | 5 |
| Stearic acid | 1 |
| Sulfur | 1.5 |
| Tetramethylthiuram disulfide | 0.5 |
| N—cyclohexyl-2-benzothiazyl sulfenamide | 1.5 |

TABLE 12

| Run No. | Comparison 29(*10) | Invention 30(*9) | Invention 31 | Invention 32(*10) |
| --- | --- | --- | --- | --- |
| Rubber component | | | | |
| Polymer H | — | 100 | 70 | 20 |
| NIPOL 1500 | 100 | — | 30 | 80 |
| Properties of the vulcanizate | | | | |
| Tensile strength (kg/cm$^2$) | 210 | 316 | 331 | 253 |
| Elongation (%) | 380 | 310 | 440 | 360 |
| 100% tensile stress (kg/cm$^2$) | 31 | 195 | 117 | 51 |
| Hardness (JIS) | 65 | 99 | 90 | 74 |

(*9)Only the polymers were press-cured at 160° C. for 10 minutes without adding compounding agents.
(*10)Forty parts of HAF carbon black added to the compounding recipe shown in Table 9.

EXAMPLE 7

One hundred parts of the rubber obtained in Production Example 5, 1 part of stearic acid, 40 parts of HAF carbon black, 2.5 parts of sulfur, 0.8 part of N-oxydiethylene-2-benzothiazyl sulfenamide and 1 part of 2,6-di-t-butyl-4-methylphenol are kneaded on a roll, and the mixture was vulcanized at 150° C. for 20 minutes. The properties of the vulcanizate were as follows:

Tensile strength: 305 kg/cm$^2$
Elongation: 560%
100% Tensile stress: 39 kg/cm$^2$
Hardness (JIS): 63
Rebound (tryptometer, room temperature): 69%
Heat generation (flexometer) HBU: 14.3° C.
Pico abrasion: 1.91×10 ml.

The unvulcanized rubber composition showed a 500% stress of 7.0 kg/cm$^2$.

For comparison, Nipol 1R2200 (high cis 1,4-polyisoprene rubber made by Nippon Zeon Co., Ltd.) was evaluated by using the same compounding recipe and vulcanization conditions as above except that the proportion of HAF carbon black was changed to 50 parts. The properties of the vulanized product were as follows:

Tensile strength: 301 kg/cm$^2$
Elongation: 590%
100% Tensile stress: 40 kg/cm$^2$
Hardness (JIS): 62
Rebound: 563%
Heat generation: 20.4° C.
Pico abrasion: 2.03×10 ml.

The unvulcanized product had a 500% stress of 2.2 kg/cm$^2$.

The results show that the rubbers in accordance with this invention increase the balance of dynamic properties.

We claim:

1. A high strength-high modulus rubbery composition comprising a mixture of rubbery copolymer containing an acenaphthylene-type monomer as a copolymer component, another rubber selected from the group consisting of polybutadiene rubber, natural or synthetic polyisoprene rubber, styrene-butadiene copolymer rubber, acrylonitrile-butadiene copolymer rubber, chloroprene rubber, ethylene-propylene-diene monomer terpolymer rubber, acrylic rubber and fluorine rubber, and compounding agents.

2. The rubber composition of claim 1 wherein the rubbery copolymer is at least one rubbery copolymer selected from a random copolymer, a block copolymer and a graft copolymer.

3. The rubber composition of claim 1 or 2 wherein the rubbery copolymer is a copolymer of an acenaphthylene-type monomer and a conjugated diene-type monomer.

4. The rubber composition of claim 1 or 2 wherein the rubbery copolymer is a copolymer of an acenaphthylene-type monomer and a nonconjugated diene-type monomer.

5. The rubbery composition of claim 1 wherein the acenaphthylene-type monomer is acenaphthylene.

6. The rubbery composition of claim 1 wherein the acenaphthylene-type monomer is substituted acenaphthylene having at least one substituent.

7. A high strength-high modulus rubbery composition comprising a mixture of rubbery copolymer containing an acenaphthylene-type monomer as a copolymer component, another rubber selected from the group consisting of polybutadiene rubber, natural or synthetic polyisoprene rubber, styrene-butadiene copolymer rubber, acrylonitrile-butadiene copolymer rubber, chloroprene rubber, ethylene-propylene-diene monomer terpolymer rubber, acrylic rubber and fluorine rubber, and compounding agents, said rubbery copolymer having a glass transition temperature of not more than 10° C., and containing 2 to 40% by weight of the acenaphthylene-type monomer.

* * * * *